United States Patent [19]

Gutierrez Rubio et al.

[11] Patent Number: 4,644,859
[45] Date of Patent: Feb. 24, 1987

[54] INTRODUCED IN CONNECTION WITH OLIVE PITTING AND STUFFING MACHINES

[75] Inventors: Joaquin Gutierrez Rubio; Antonio Garrido Diaz, both of Seville, Spain

[73] Assignee: Sociedad Anonima de Racionalizacion y Mechanizacion (SADRYM), Spain

[21] Appl. No.: 726,821

[22] Filed: Apr. 24, 1985

[30] Foreign Application Priority Data

Nov. 21, 1984 [ES] Spain ................................ 537820

[51] Int. Cl.⁴ .............................................. A23N 4/08
[52] U.S. Cl. ........................................ 99/494; 99/548; 99/561
[58] Field of Search ................. 99/494, 542, 546, 548, 99/544, 549, 552, 555, 565, 559–561; 426/485, 484, 282

[56] References Cited

U.S. PATENT DOCUMENTS 4,096,794  6/1978  del ser Gonzalez ................. 99/494
4,096,795  6/1978  del ser Gonzalez ................. 99/494
4,265,169  5/1981  Silvestrini .......................... 99/494
4,290,350  9/1981  del ser Gonzalez ................. 99/494
4,388,858  6/1983  Margaroli et al. ................... 99/494

Primary Examiner—Timothy F. Simone
Attorney, Agent, or Firm—Cushman, Darby & Cushman

[57] ABSTRACT

The machine for pitting olives and for stuffing the pitted olives with an edible paste, such as anchovy paste, a plurality of axially opening bonnets are arranged in a circle for rotation about an axis through a succession of stations. At a first station, a pit-containing olive is placed in each bonnet and held there by a fastening bush. Subsequently, the pit with an adhered tapin is punched from the olive; the pit is severed from the tapin and only the tapin is retained. As the pitted olive is rotated to a further station, a succession of orifices of a nozzle connected to an injector for stuffing paste is temporarily opened to the olive cavity. Then a gelification agent is applied to the paste contained in the olive, the saved tapin is restored to the olive as a cavity closure, and the fastening bush is withdrawn, freeing the stuffed olive from the machine.

7 Claims, 18 Drawing Figures

A-B

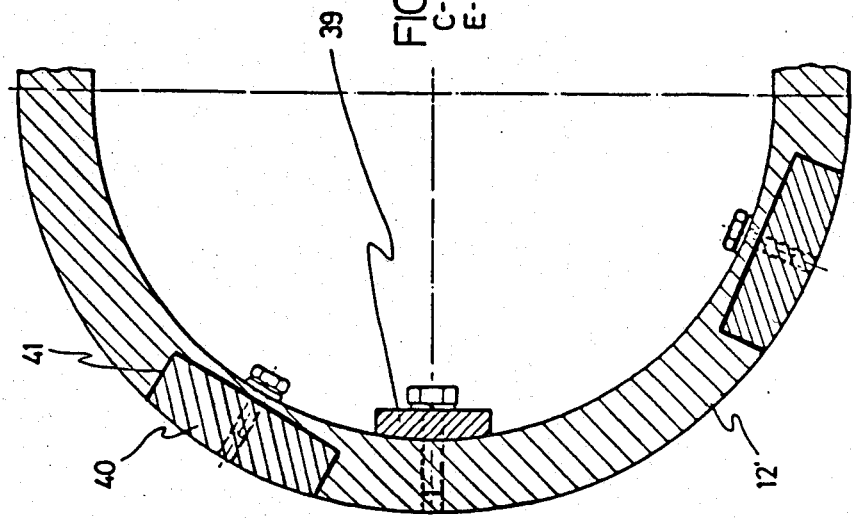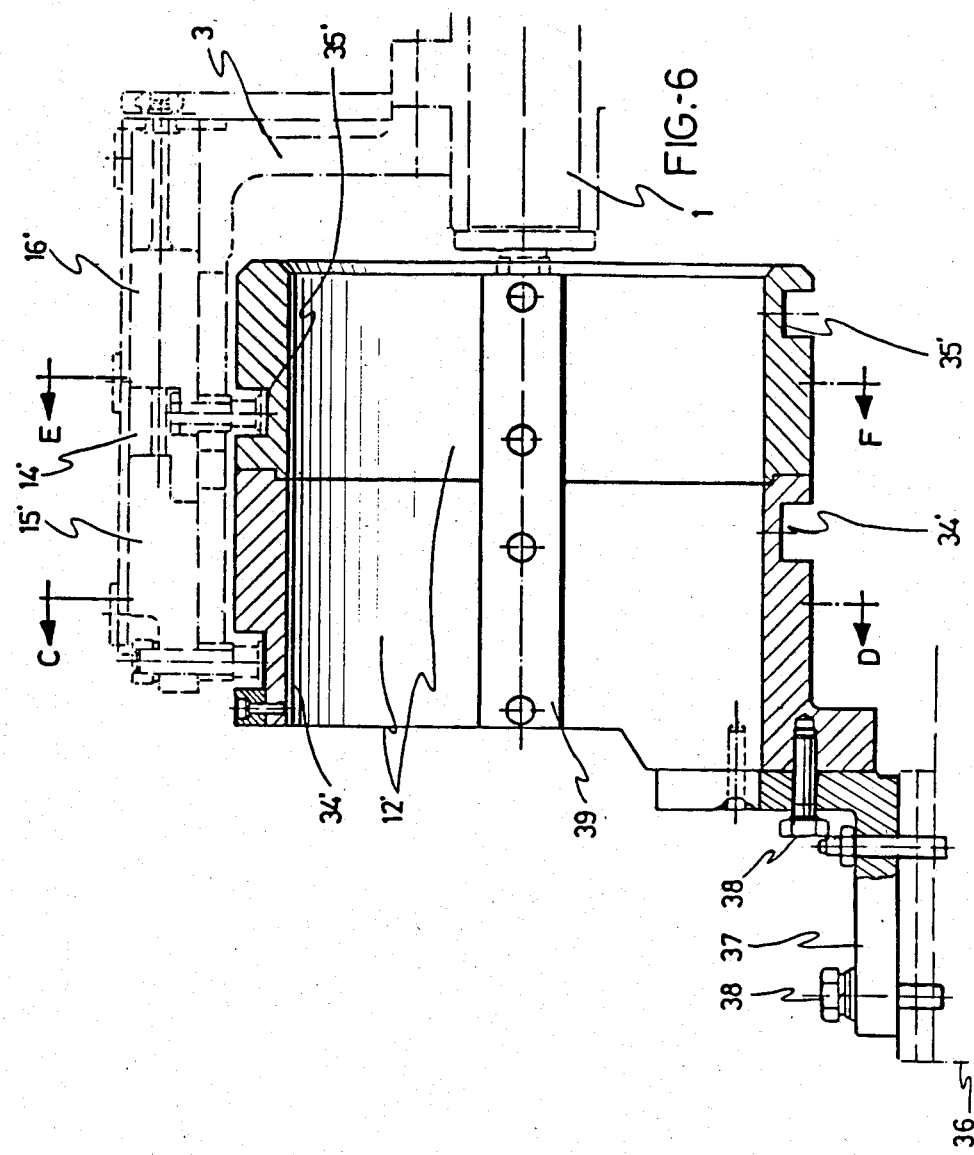

… … …

INTRODUCED IN CONNECTION WITH OLIVE PITTING AND STUFFING MACHINES

BACKGROUND OF THE INVENTION

The present invention relates to a series of improvements introduced in connection with olive pitting and stuffing olives machines of the type used for stuffing with anchovies, that is to say, machines designed for pitting and then stuffing the previously pitted olives with anchovies, which improvements have an effect both on the devices for stuffing olives with anchovies or with other products and the devices for eliminating the pit and further recovering that portion of the olive which is removed in order to permit the extraction of the pit from the olive. That portion is ordinarily known in the trade as a "tapin".

Briefly, the invention provides a machine capable of receiving the olives from a corresponding feed chain, fixing said olives unitarily, causing extraction of the pit, retaining the tapin ripped by the action of the pit being extracted, introducing inside the hollow interior of the olive anchovy dough or another product suitable for that cavity, and, finally, closing the olive cavity with the cooperation of the tapin which was loosened during the pitting stage, or, alternatively, recovering the tapin and placing it aside. Furthermore, all of these operations are carried out in a sequential manner, in a continual process, resulting in a high operative speed for the machine.

As opposed to the classical and already obsolete olive pitting and stuffing machines, of alternative operation, there have been known for a long time now continual operation machines, which basically incorporate a drum mounted rotatably about a fixed horizontal shaft, in the periphery of which are established a number of pitting and stuffing elements which can be activated by means of corresponding eccentrics or cams, in a manner such that the different operating stages to which each one of the olives is subjected take place at a zone of the periphery of the drum, as the drum advances in its continuous rotation, all of which is carried out such that the olives reach the drum unitarily, duly synchronized with the perimetral movements of said drum, and the mechanisms of the drum act simultaneously upon a certain number of olives, in a manner such that, while a first olive is being received, a second olive is going through the pitting stage, a third olive is being stuffed, a fourth olive is receiving the closing tapin and a fifth olive is leaving the machine, jointly with another series of intermediate stages which will vary depending on the different type of machines, the description of which machines is not considered necessary.

Machines of this type, i.e. olive pitting and stuffing machines of continual operation, are the subject matter of several patents, among which is Spanish Pat. No. 428.593, owned by the applicants' assignee.

In more concrete terms, the existing patents contemplate a structure based on punches capable of punching the olive pulp while the olive remains stationary, cutting rods cooperate with these punches and remove the tapin from the olive, providing an opening through which the pit of the olive is taken away by means of the aforesaid punches, thereby leaving the olive in perfect condition to receive the corresponding stuffing dough.

However, all of those previously disclosed machines present inconveniences in regard to the means for fixing the olive throughout the process to which it will be subjected, lack means for fixing the pit until the moment in which its elimination is found to be convenient. Additionally they are provided for stuffing the olive with strips of pepper, and so such machines are not suitable for stuffing with products presented in the form of a dough, as in the case of the anchovy. Particularly, in the case of the introduction of a little strip of pepper, a punch is used. Such a punch fastens the strip of pepper at its middle zone, bends it over itself and introduces the folded strip inside the hollow interior of the olive. The pepper strip introducing punch would be inoperative if one attempted to use it to introduce inside the olive not a strip of a certain rigidity and considerable consistency, such as a pepper strip has. but rather a uniform dough of a much lesser consistency.

Last of all, in regard to other conventional machines which contemplate that the olive stuffing used be an anchovy dough, the stuffing operation is carried out with a similar complex structure of a high cost and limited results, specifically, with the cooperation of two parallel plates, one of which is placed outside the pitting drum. That structure is usually designed to supply predetermined dosages of anchovy dough which are displaced radially towards the second plate where they will be received inside corresponding housings, with which housings cooperates a pushing rod which facilitates the subsequent and definitive displacement of the dough towards the hollow interior of the olive.

SUMMARY OF THE INVENTION

All of these problems are solved in a fully satisfactory manner thanks to the improvements which constitute the object of the present invention.

To that end, the machine proposed by the invention is constituted, as it is conventionally established, starting from a horizontal tree on which are coaxially arranged two oscillating drums, duly synchronized with a feed chain which feeds olives unitarily, each said drum being aided by a set of immovable cams with which the axial displacement of the pitting mechanisms is controlled.

Starting from this basic structure and in accordance with one of the special features of the invention, on one of the drums, hereinafter known as the pitting drum, there is established a number of pitting punches, telescopically displaceable along the interior of a carriage which is likewise displaceable in the same direction and to which is associated a fastener which also moves in the same direction, against the tension of a spring, in a manner such that the fastener is pulled by the carriage until it is in contact with the olive, retracting itself with respect to the carriage, at the end of the run of said carriage, and supplying the olive, by means of the aforesaid spring, with the pressure required to keep said olive perfectly fixed against a disk placed between the two drums and provided, at the periphery thereof, with a series of bonnets designed to support the opposite extreme zone of the olive. Each bonnet also acts as a die during the punching operation, in a manner such that the tearing of the tapin of the olive and the removal of both the tapin and the corresponding pit are produced through the edge of the central orifice of the bonnet.

The abovementioned movable elements, that is to say, the punch and the carriage-fastener, are activated independently by means of respective rollers arranged inside corresponding cams associated with the fixed tree.

As for the second drum, hereinafter known as the stuffing drum, whose specific object is that of receiving and retaining the tapin until such time as, subsequent to the stuffing of the olive, it will be necessary for the tapin to be positioned on the inlet of the olive, said drum further acting as a definitive positioning element for the tapin and incorporating, on its periphery, an equivalent number of mouthpieces capable of receiving the respective tapins, inside the mouthpieces operate corresponding pushing rods designed to carry out the removal of the tapin from the mouthpiece and/or its coupling with the olive, at the end of the process. As in the case of the pitting drum, each mouthpiece is slidably mounted on the interior of a carriage and against the tension of a spring, at the same time as each one of said rods is associated to a second carriage, both carriages sliding on a common guide and being aided by respective rollers arranged inside corresponding ring-shaped cams, which cams are stiffened to the corresponding sector of the fixed tree.

Fixed to this second drum, i.e., the stuffing drum, there is a pitstorage disk on which, in correspondence with each mouthpiece, there is situated a housing capable of fastening the pit, next to the punching stage, and likewise capable of retaining said pit until the moment of its elimination. Elimination of the pit is acomplished by the joint propulsion of the tapin-holder mouthpiece and the corresponding rod.

A further characteristic of the invention is based on the fact that, between the pit-storage disk and the bonnet-holder disk, there is situated an injector which receives the dough of anchovy or other stuffing material, at a previously determined pressure, as supplied by a lobe pump. This injector is provided with a nozzle establishing a close contact with the bonnet-holder disk and which, on its face adaptable to this last disk, presents a number of orifices through which the dough of anchovy is supplied to the interior of the olives, as said olives run over such pouring orifices, and to which effect the orifices of the injection nozzle are situated on an imaginary circumferential line coinciding with that of location of the bonnets on the corresponding disk.

In a more concrete manner and with the object of ensuring a perfect sealing between the injection nozzle and the bonnet-holder disk, capable of eliminating every possibility of leakage for the anchovy dough, it is contemplated that the injection nozzle be permanently acted upon against the bonnet-holder disk by a set of compression springs.

Therefore, the anchovy dough is supplied through the corresponding hopper. Due to the cooperation of the aforesaid lobe pump with the injection nozzle, where said dough is held at a certain pressure, when the outlets of the nozzle face the inlets of the olives, specifically the orifices of the bonnets to which the olives are coupled, the pouring of the dough from the injector into the olive occurs. The existence of a plurality of pouring orifices on the injection nozzle determines a fragmentation in the supply of the dough, that is to say, the anchovy dough reaches the interior of the olive after successive and independent stages, all of which bring about optimum results from a stuffing point of view.

To complement the described structure and constituting a further characteristic of the invention, there has been foreseen that, immediately close to the injection nozzle, there will be placed a nozzle which supplies a solution capable of causing the gelification of the outer surface of the anchovy dough already placed inside the olive, thus generating a thin capsule which prevents dispersion of the product, once the pitting and stuffing processes have been completed, when the olive is introduced into the brine or macerating fluid. To that end, a calcium chloride solution is used which, properly driven from a supplying tank, reaches the dripping nozzle and pours its contents directly into the inlets of the olives.

Besides, prior to the positioning of the injection nozzle, there is placed, also between the pit-storage disk and the bonnet-holder disk, a second water-pouring nozzle, designed to effect a "washing" of the disks, thus eliminating the likely residues produced during the removal of the pit and the tapin from the body of the olive.

Apart from that, between said washing nozzle and the nozzle which injects the anchovy dough, there is placed a blade, equally immovable, but, in this case, arranged between the stuffing drum and the pit-storage disk. This blade has an influence on the pit-tapin assembly, causing the separation of the two elements, the tapin remaining housed inside the corresponding mouthpiece of the stuffing drum, while the pit is retained by the pit-storage disk until such time as it reaches the next stop-blade which makes the pit independent from said pit-storage disk and causes the pit to fall upon the corresponding pit collector.

BRIEF DESCRIPTION OF THE DRAWINGS

To complement the following detailed description and for a better understanding of the characteristics of the invention, reference is made, as an integral part of the invention, to the accompanying drawings which, in an illustrative and non-limitative manner, show the following:

FIG. 6 is a detail of a diametrical sectional view of a pair of cams, duly mounted on the fixed tree, upon which cams are shown, in discontinuous stroke, the devices thereby actuated.

FIG. 7 is a detail of a sectional view of the cams illustrated in the precedent figure along line C-D and D-F of said FIG. 6.

DETAILED DESCRIPTION

Figure 1:
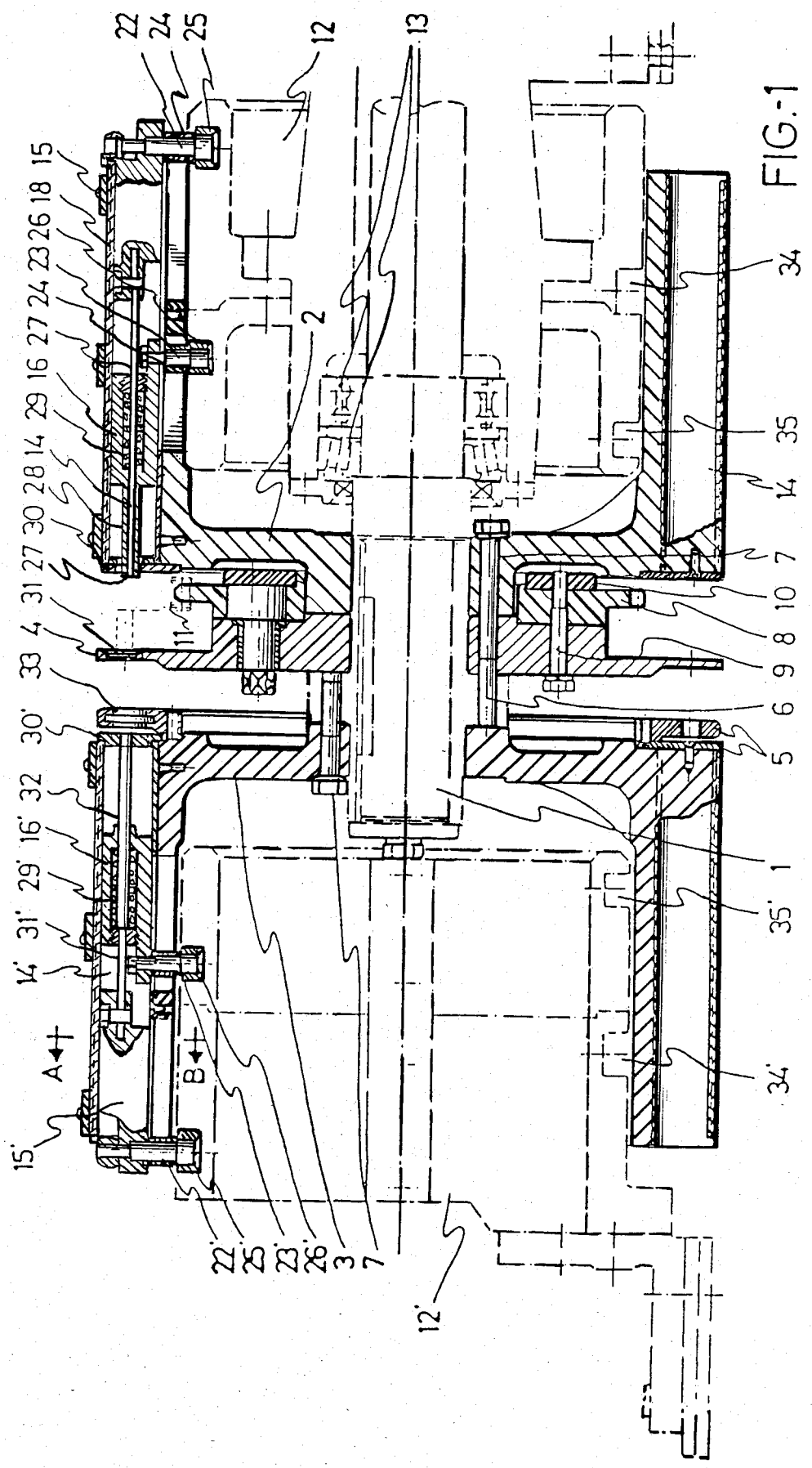
FIG. 1 is a partial diametrical sectional view of a drum corresponding to a pitting-stuffing machine according to the improvements proposed in the present invention.

Referring to the drawings and more specifically referring to FIG. 1, it can be seen how, on a machine constructed according to the improvements proposed, there is established, independently of other fully conventional complementary devices, such as the supporting bedplate, the feed hopper, the driving unit, etc., a drum provided with a horizontal tree, on which drum are established a fixed zone and a movable zone, said movable zone being mounted on a shaft 1 and being constituted by the pitting drum 2 and the stuffing drum 3, mounted coaxially opposed to each other. Between the two drums is basically established the bonnet-holder disk 4, while a pit-storage disk 5, facing the bonnet-holder disk 4, is associated with the stuffing drum 3.

All of these elements are duly stiffened with each other, specifically by means of a ring-shaped expansion 6 of the shaft 1, situated between the bonnet-holder disk 4 and the stuffing drum 3, and with the cooperation of screws 7, as clearly illustrated in FIG. 1.

Between the pitting drum 2 and the bonnet-holder disk 4, there is established a geared ring 8 which is linked to the bonnet-holder disk 4 with the cooperation of screws 9 and a ring 10, this geared ring 8 being designed to pull the feed chain 11, which feeds olives unitarily, towards the entire drum. The feed, as clearly illustrated in FIG. 1 is carried out between the bonnet-holder disk 4 and the pitting drum 2.

This assembly receives the required oscillating movement from the driving unit, through the shaft 1 itself, which operates at the hollow interior of the fixed block 12 corresponding to a set of cams, as it will be seen at a later stage, through bearings 13.

Figure 2:
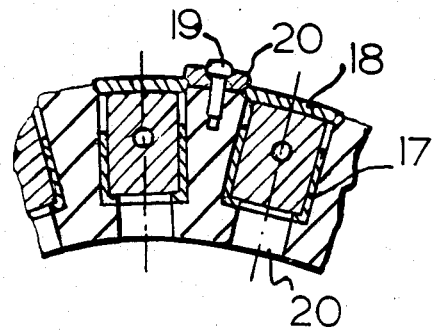
FIG. 2 is an enlarged sectional view of a portion of the stuffing drum along line A-B of FIG. 1.
Figure 3:
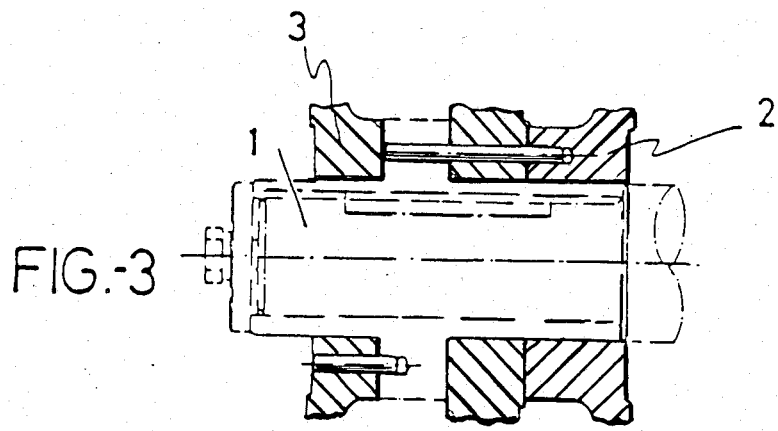
FIG. 3 is an enlarged detail of the manner in which the stuffing and pitting drums, as well as the bonnet-holder disk established between them, are fixed to the tree.

On the pitting drum 2, specifically on its periphery, there are established prismatic housings 14, parallel to its shaft, inside which housings two carriages 15 and 16 slide through guides 17, there being provided that, in order to facilitate the mechanization of said housings 14, the housings will be materialized into channels opened, in principle, towards the periphery of the drum and will be closed by means of respective fixable caps 18 and with the cooperation of screws 19 and washers 20, as can be gathered from the detail illustrated in FIG. 2, at the same time as said housings 14 have, at a lower zone thereof, longitudinal slots 21 inside which operate shafts 22 and 23, respectively associated to carriages 15 and 16, and which, with the cooperation of spacing bushes 24, receive, through their inner ends, respective rollers 25 and 26 designed to control said carriages by means of respective cams, as it will be seen at a later stage.

Locked together with the carriage 15 is a punch 27 designed for pitting the olive and operating inside a fastening bush 28, associated in turn to the carriage 16, but with the peculiarity that these elements, i.e., the fastening bush 28 and the carriage 16, are interrelated through a spring 29 which permits the bush 28 to remain static, at the end of the displacement of the carriage 16 operable by the corresponding cam, as it will be seen later on.

The fastening bush 28 and the corresponding axial punch 27 are displaceable towards the stuffing drum, emerging from the housing 14 through a guide nozzle 30, operationally arranged inside said housing and perfectly facing the corresponding bonnet 31 established on the bonnet-holder disk 4.

Apart from that, on the stuffing drum 3, likewise having an effect on its entire periphery and located at positions operationally confronted with those of the punches existing in the pitting drum, there are equally established two carriages 15' and 16' mounted on guides existing inside the housing 14', all of which has been structured in exactly the same manner as in the case of the pitting drum 2. Therefore, the carriages 15' and 16' have shafts 22' and 23' as well as rollers 25' and 26' which serve to activate these carriages by means of the corresponding cams.

Locked together with the carriage 15' is a rod 31' designed to push the tapin-pit unit, in the first place, and subsequently designed to push the tapin alone, this rod remaining coaxially mounted on the interior of the bush 32, associated to the carriage 16' through the spring 29', as in the case of the fastening bush, these elements being suitably guided, as they leave the housing 14', by the ring 30'.

Similarly, on the pit-storage disk 5, likewise coaxially facing the punches 27, there are established respective housings 33, composed of two flexible rings, as clearly illustrated in FIG. 1, for each one of the pits.

As stated above, the carriages 15, 16, 15' and 16' are activated by respective cams, specifically those cams referred to with numbers 34, 35, 34' and 35', materialized into the immovable drums 12 and 12', the second of these drums being illustrated in full detail in FIG. 6. This figure also shows the manner in which the cams are mounted to the chassis 36 of the machine with the cooperation of angular profiles 37 and screws 38, at the same time as the two sectors of each one of the drums 12 and 12' corresponding to the respective cams 34–35 and 34'–35' are mounted with each other by means of inner flatbars 39 which are screwed on their generants and of outer flatbars 40 housed inside emptied spaces 41, also arranged in the direction of their generants, thus defining a perfectly cylindrical outer surface, with the exception of the grooves 34 and 35 corresponding to the cams themselves.

Figure 5:
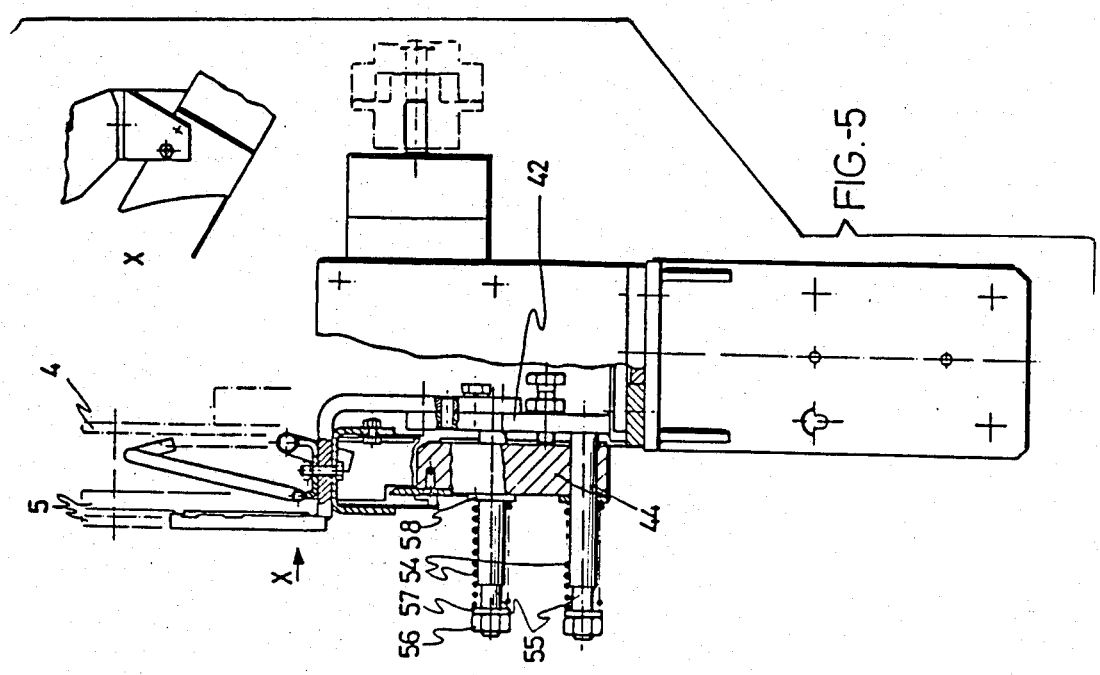
FIG. 5 is a profile of the same assembly as illustrated in the previous figure, partly cross-split in order to show its structure in full detail.

To complement the described structure, there is fixed to the chassis 36 of the machine, in correspondence with the middle zone of the general drum, a support 42 on which is installed an injector 43 for the anchovy dough, in a manner such that said injector adapts to the bonnet-holder disk 4 and it is located at the space existing between said last disk and the pit-holder disk 5, as clearly illustrated in the profile of FIG. 5.

Figure 4:
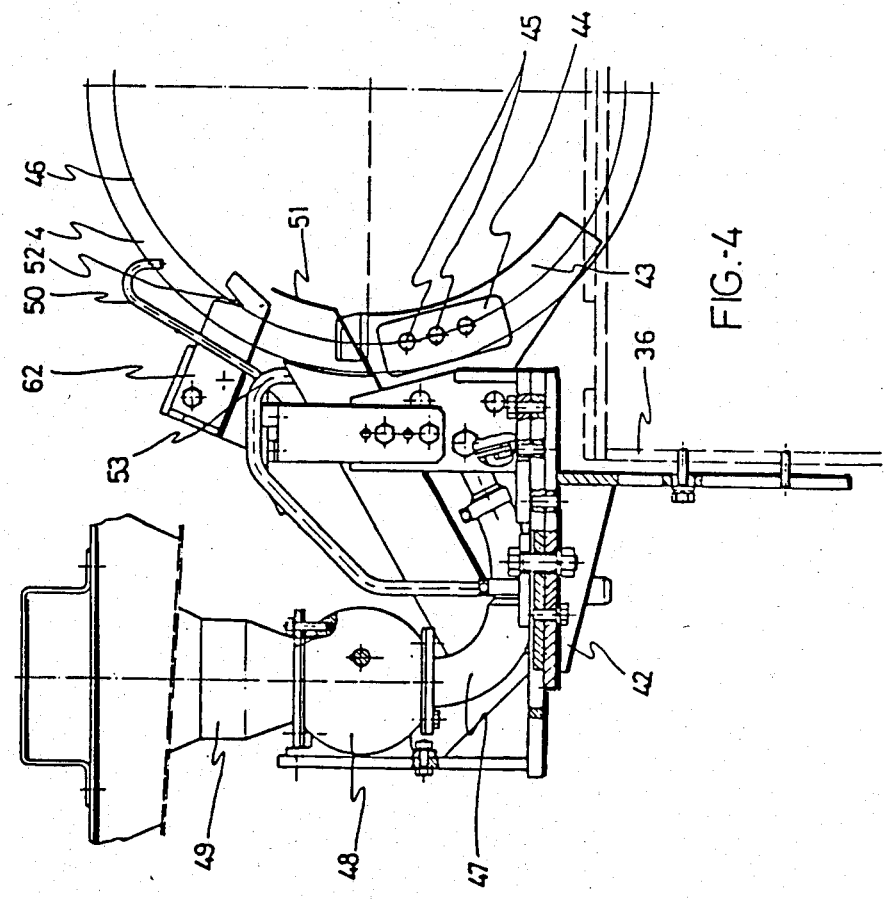
FIG. 4 is a front elevational view of the assembly corresponding to the mechanism which supplies the anchovy dough, jointly with the remaining immovable elements which are installed between the pit-storage disk and the bonnet-holder disk.

Injector 43 incorporates a nozzle 44 provided with several orifices 45, through which the anchovy dough passes, preferably to the number of three, as clearly illustrated in FIG. 4, duly aligned on a circumferential line which coincides with the imaginary line 46 on which are included all of the bonnets 31, in a manner such that, as it will be seen later on, the anchovy dough leaves through the orifices 45 when they confront the bonnets 31 and through these bonnets passes to the interior of the olives.

Injector 43 is fed, through the conduction 47 and with the cooperation of a peristaltic or lobe pump 48, from a hopper 49 which supplies the anchovy dough.

Complementary to and mounted on the support 42 itself, there is a conduit 50 which, as clearly illustrated in FIG. 5, is designed to unload water on the line 46 of bonnets, in order to eliminate the residues existing in the bonnet-holder disk 4 and produced during the pitting operation, while underneath the conduit 50 and likewise associated to the support 42 there is situated a blade 62 provided with a V-shaped notch 52 which likewise coincides with the line 46 of bonnets and which is intended to cause the separation of the pit from the tapin, there being provided, underneath the blade and already located at the stuffing zone, another conduit 53 designed to supply the stabilizing solution for the anchovy dough, specifically the aforesaid calcium chloride solution.

Thus, in accordance with what has been set out above, the bonnet-holder disk 4 rotates in close contact with the injection nozzle 44, there being anticipated that, in order to ensure a perfect sealing between these elements, the nozzle 44 is permanently pressed against the disk 4 with the cooperation of springs 54 mounted on respective stems 55, in a manner such that these stems are linked to the support structure 42 and inside them freely operates the nozzle 44 which is pressed against the disk 4 by the action of the springs 54, established between that face of the nozzle 44 opposite to the disk 4 and nuts 56 situated on the threaded ends of the stems 55, with the insertion of corresponding extreme washers 57 and 58.

Figure 8:
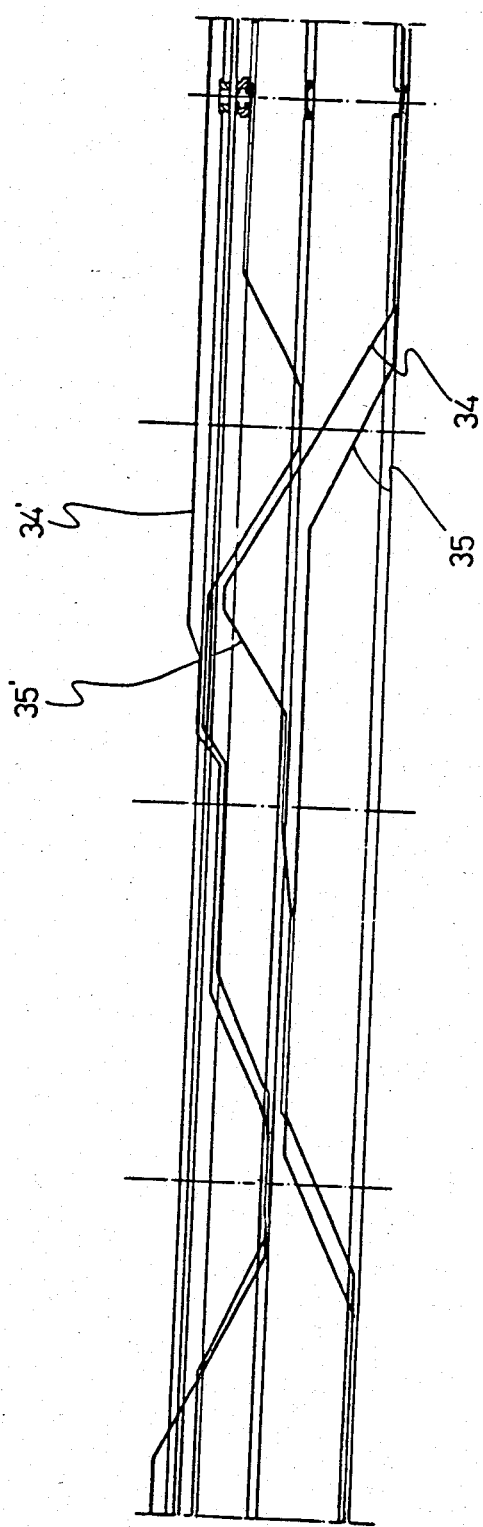
FIG. 8 is a layout of the four cams which participate in the activation of the movable elements of the machine drum.

FIG. 8 illustrates in full detail the development of the cams with respect to the spacing existing between the pitting and stuffing drums, the pit-storage disk and the bonnet-holder disk, which elements are mounted immovably with respect to each other, and, consequently, maintain their axial spacing constantly. This figure shows the same reference numbers 34, 35, 34' and 35' which respectively correspond to the activation of the pitting punch, the fastening mouthpiece, the pushing rod and the mouthpiece which retains the tapin. FIG. 8 also illustrates, duly marked and graded, the inflexion points in the path of the cams.

Figure 9:
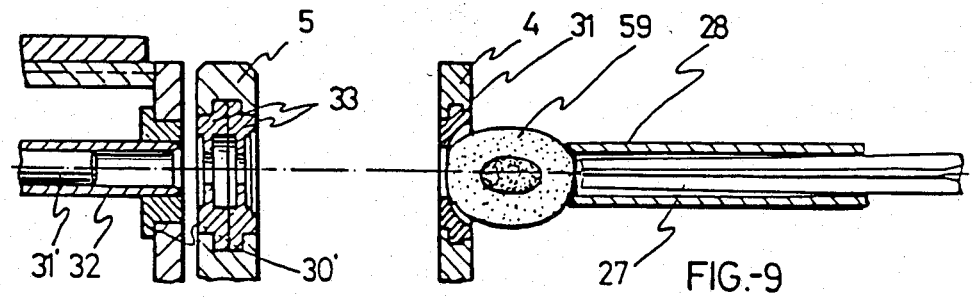
FIG. 9 is a detail of a diametrical section view of each one of the operating units of the machine at the starting point of an action cycle, specifically, at that position corresponding to the start of said cycle, that is to say, the fixing of an olive.

In accordance with the structure so far described, when the olive being displaced by the chain 11 enters the drum and remains properly confronted with the bonnet 31, the cam 35 acts upon the fastening mouthpiece which projects itself towards the olive 59 and presses said olive against the bonnet 31, as clearly illustrated in FIG. 9.

Figure 10:
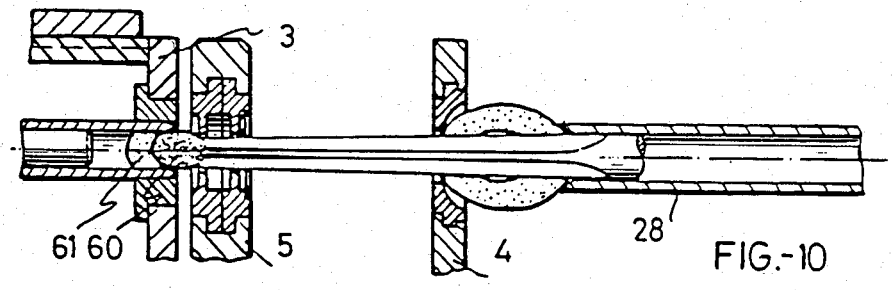
FIGS. 10, 11, 12, 13, 14, 15, 16 and 17 show consecutive stages of the operating process covering the pitting, stuffing and closing of the olive operations.
Figure 11:
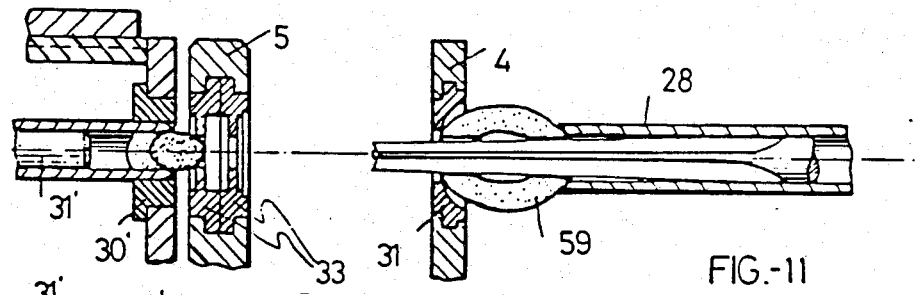

Immediately after that and in accordance with what has been illustrated in FIG. 10, the cam 34 causes the projection of the punch 27 which pierces the olive 59, thus causing the pitting of the olive, as it pulls the pit 60, in parallel to the loosening of the tapin 61, and further displacing both, the pit and the tapin, towards a limit situation in which said tapin remains housed inside the mouthpiece 32, while the pit remains placed between the stuffing drum 3 and the pit-storage disk 5. The punch 27 will then retract itself, as clearly illustrated in FIG. 11.

Figure 12:
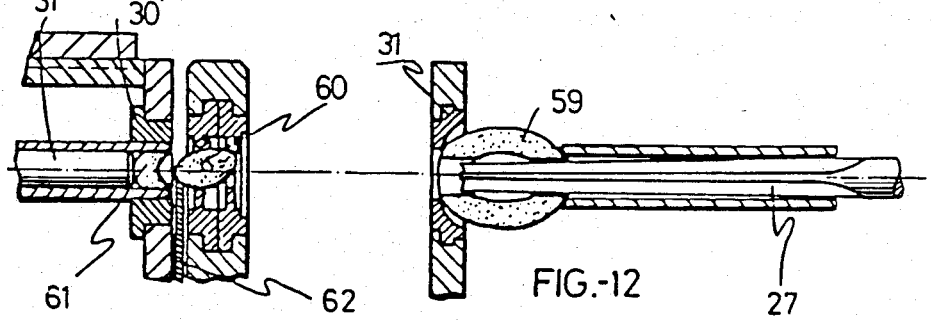

Parallel to that retraction of the punch 27, as can be seen in FIG. 12, the drum, in its oscillating movement, reaches the immovable blade 62, established between the drum 3 and the disk 5, causing the separation of the pit with respect to the tapin and displacing the pit in a lateral direction, such that the pit remains perfectly fixed on the flexible lips of the housing 33.

Figure 13:
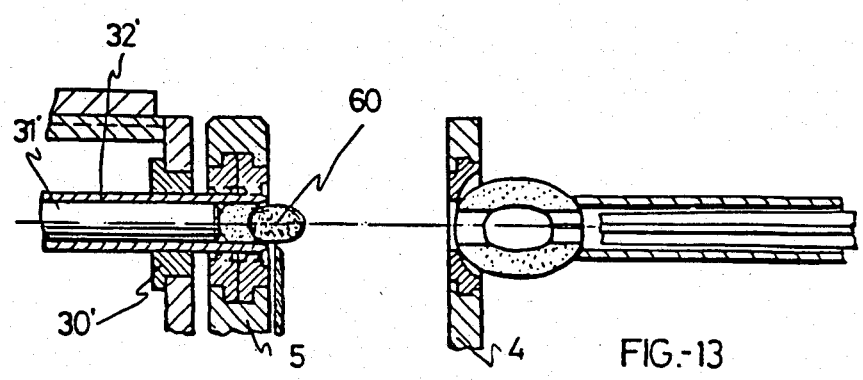
Figure 14:
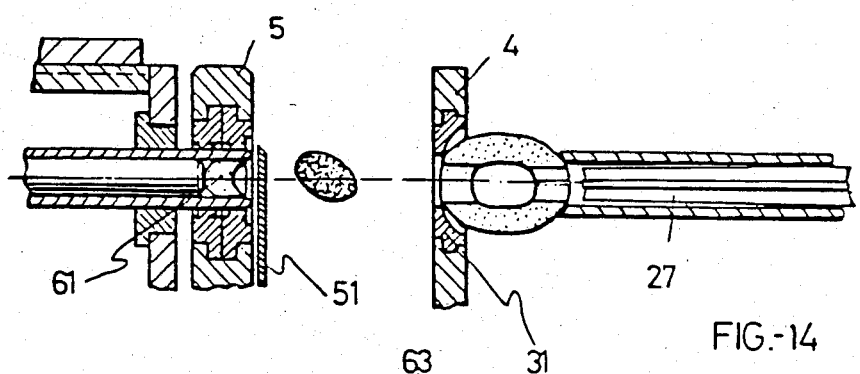

Subsequently, as clearly illustrated in FIG. 13, the cams 34' and 35' simultaneously displace the rod 31' and the mouthpiece 32 until they reach the opposite face of the disk 5. Immediately after that, this assembly encounters, in the path of the drum, the blade 51 which causes the pit to be expelled towards the corresponding collector. In the course of these operating stages the punch 27 reaches its position of maximum retraction.

Figure 15:
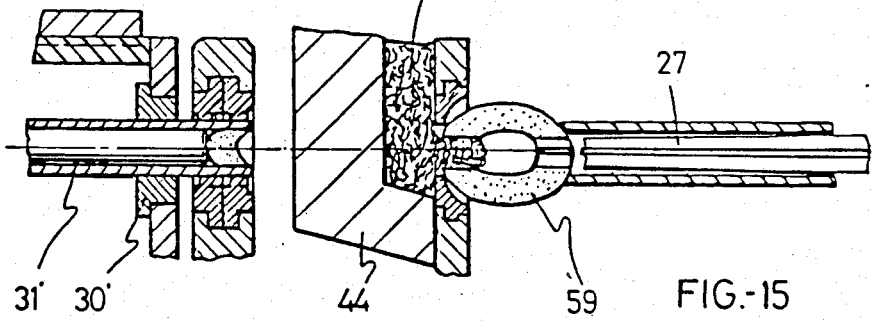

Later on, as clearly illustrated in FIG. 15, the injection nozzle 44 faces the bonnet 31 and the anchovy dough 63 passes through the orifices 45 existing in the nozzle and into the hollow interior of the olive 59, which pouring is carried out under pressure and intermittently, in three consecutive stages, through the three orifices 45 provided on the nozzle.

Figure 16:
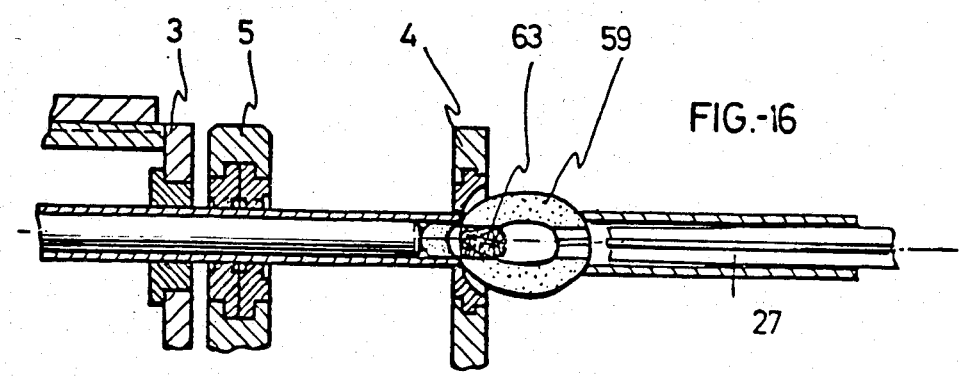
Figure 17:
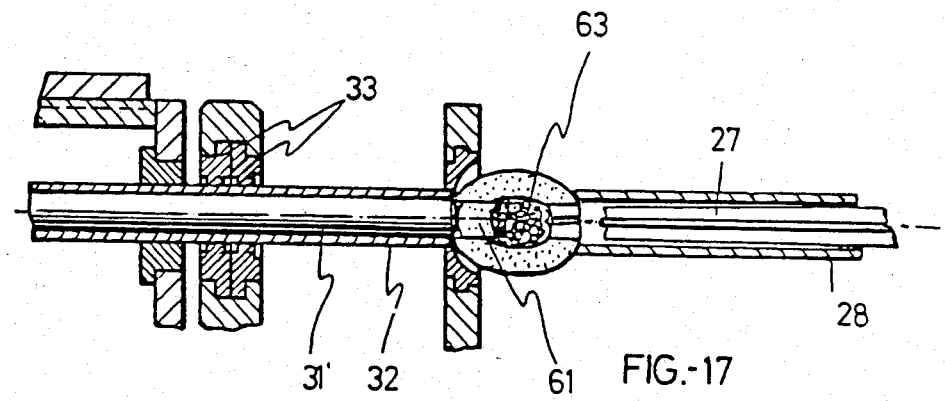

As the drum leaves the zone corresponding to the nozzle 44, as clearly illustrated in FIG. 16, the cams 34' and 35' cause a greater axial displacement of the rod 31' and the mouthpiece 32, such that the mouthpiece reaches the bonnet 31 and adapts itself to the inlet of the olive 59, at which point in time the mouthpiece stops moving, whereas the rod 31' will continue its axial displacement, pulling the tapin 61 and effecting the definitive positioning of said tapin into the body of the olive, as clearly illustrated in FIG. 17.

Figure 18:
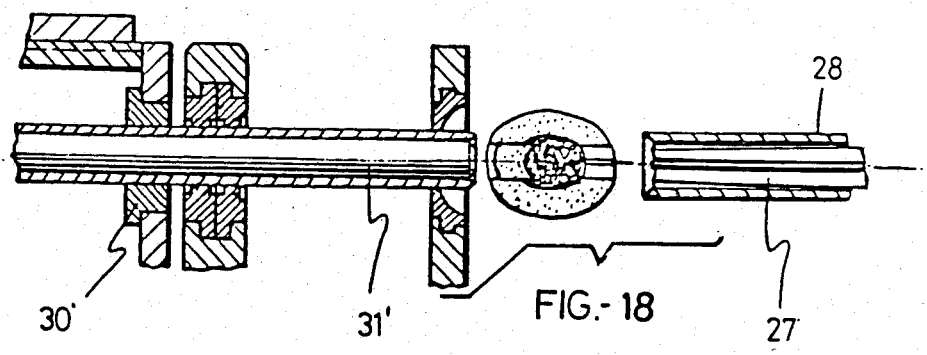
FIG. 18 illustrates the completely finished olive and the abovementioned operating unit in an open disposition in order to cause the olive to drop by gravity into the corresponding olive collector.

Last of all, the fastening mouthpiece 28, which has remained static throughout the process, fixing the olive 59 against the bonnet 31, retracts itself when activated by the corresponding cam 35 and the olive is then released, as clearly illustrated in FIG. 18, and likely to fall into the corresponding collector, in that release also participates the unit formed by the rod 31' and the mouthpiece 32, as a consequence of a last and short displacement stage, as likewise clearly illustrated in said FIG. 18.

It is not considered necessary to enlarge upon this description to enable a skilled person in the art to fully comprehend the scope and advantages which are derived therefrom.

The materials, shape, size and disposition of the elements are likely to be changed, provided that such changes will not alter the essentiality of the invention.

The terms used to describe the invention should always be regarded in a broad and non-limitative sense.

What is claimed is:

1. A machine for pitting olives and for stuffing the pitted olives with an edible paste, this machine comprising:

a plurality of bonnets arranged in a circle, centered on an axis, all of these bonnets facing in a like axial direction; each said bonnet having a centrally-ported annular recess constructed and arranged to support a single, axially-aligned, pit-containing olive, by one end of that olive; each recess having a central port of sufficient size to pass an axially-aligned olive pit therethrough;

means for rotating said bonnets successively through a plurality of stations, including a first station at which each bonnet is arranged to receive a single axially-aligned olive to be supported in the respective said recess for rotation with the respective said bonnet;

a respective plurality of olive-holding bushing means arranged in a circle centered on said axis and arranged to rotate about said axis with said bonnets; each said bushing means being adapted to engage an opposite end of a respective olive generally in opposition to the respective said recess, beginning at said first station and continuing through said plurality of stations, for holding that olive seated in the respective said recess; each said bushing means being configured to centrally expose, for punch access, an end portion of the olive engaged thereby;

means associated with rotation of said bonnets through said plurality of stations, for moving each olive-holding bushing means into engagement with an end of a respective said olive and for maintaining such engagement as the bonnet supporting such olive is rotated through a plurality of stations, and for then moving out of engagement with that olive so as to release that olive from said machine;

punch means aligned with said axis and arranged to address each respective olive at a respective station by moving axially towards that olive, piercing that olive, engaging the pit of that olive, and pushing that pit and a tapin connected therewith completely through the respective said central port of the respective said recess of the respective said bonnet, and then to retract through that central port until clear of the respective resultingly-pitted olive;

means associated with rotation of said bonnets through said plurality of stations, for moving said punch means to address each respective olive;

a system for containing and supplying an edible paste, this system including a hopper adapted to contain said paste, nozzle means adapted to dispense said paste, conduit means connecting said hopper with said nozzle means, and pump means adapted to draw paste from said hopper and force such paste along said conduit means for dispensing such paste from said nozzle means;

means stationarily mounting said nozzle means in juxtaposition to said circle of said bonnets on an axially opposite side of said circle of said bonnets from said circle of said olive-holding bushing means and at a paste-filling station that angularly trails where the respective punch means, upon retracting to clear the respective resultingly-pitted olives, clear the respective central ports of the respective said bonnets; the nozzle means being arranged to open towards the respective central ports of the respective bonnets at said paste-filling station;

and means associated with rotation of said bonnets through said plurality of stations, for closing said nozzle means except when said nozzle means is in communication with a respective said resultingly pitted olive through a respective said central port of a respective said bonnet.

2. The machine of claim 1, wherein:
said system for containing and supplying an edible paste is adapted to contain and supply anchovy paste.

3. The machine of claim 1, wherein:
said bonnets are mounted on a disk having a face, this disk being associated with said rotating means;
said nozzle means being arranged to be pressed against said disk between said bonnets for thus providing said closing means for said nozzle means.

4. The machine of claim 3, wherein:
said nozzle means includes a plurality of orifices which are spaced from one another by amounts corresponding to spacing between adjacent ones of said bonnets, so that each pitted olive is filled with said paste in a succession of temporally-spaced increments, with each increment being dispensed from a respective said orifice.

5. The machine of claim 4, wherein:
said nozzle means includes at least three said orifices.

6. The machine of claim 1, further comprising:
in regard to said bonnets, a respective plurality of pit storage housings arranged in a circle centered on said axis and arranged to rotate about said axis with said bonnets; each said pit storage housing being in axial alignment with a respective said bonnet on an axially opposite side of said bonnets from said olive-holding bushing means;

in regard to said bonnets, a respective plurality of tubular mouthpieces arranged in a circle centered on said axis and arranged to rotate about said axis with said bonnets; each said tubular mouthpiece being in axial alignment with a respective said bonnet on an axially opposite side of said pit storage housings from said bonnets; each said tubular mouthpiece having an open end facing the respective said pit storage housing;

a pin means reciprocatingly received in each said tubular mouthpiece between positions of extension and retraction axially thereof in respect to said open end thereof;

means associated with rotation of said bonnets through said plurality of stations, for reciprocating said pin means in the respective said tubular mouthpieces between said positions;

said means for moving said punch means to address each respective olive, is adapted, when moving each punch means to push the respective pit and respective tapin connected therewith completely through the respective said central port of the respective recess of the respective said bonnet, to push that tapin through the respective said open end of the respective said tubular mouthpiece while the respective said pin means is in said position of retraction, whereby the tapin is held in said open end, prior to retraction of said punch means;

a knife mounted for intercepting each said pit while that pit remains attached to a respective tapin that is held in a respective said open end of a respective said tubular mouthpiece and for detaching that pit from that tapin and displacing that pit into the respective said pit storage housing;

means associated with rotation of said bonnets through said plurality of station, for reciprocating said tubular mouthpieces in a succession of stages, in a first of which the respective tapin which has been separated from a respective pit is thrust in the respective said tubular mouthpiece, into the respective said pit storage housing, thus expelling the respective said pit therefrom for collection and in a second of which the open end of the respective said tubular mouthpiece is juxtaposed with the respective said central port of the respective said bonnet, so that said means for reciprocating said pin means may extend the respective said pin means to said position of extension thereof for thereby expelling the respective said tapin into the respective paste-containing, pitted olive, as a plug therefor.

7. The machine of claim 6, further comprising:
means associated with rotation of said bonnets through said plurality of stations, for applying a quantum of gelification agent in liquid form to said paste contained in each said olive after such paste has been dispensed into such olive but before the respective said tapin has been expelled into such olive from the respective said tubular mouthpiece.

* * * * *